US00RE38639E1

(19) United States
(12) Reissued Patent
Oses et al.

(10) Patent Number: US RE38,639 E
(45) Date of Reissued Patent: Oct. 26, 2004

(54) COMPOSITION COMPRISING A MIXTURE OF ALKOXYLATED MONO-, DI- AND TRIGLYCERIDES AND GLYCERINE

(75) Inventors: Maria Jose Bermejo Oses, Viladecans (ES); Miguel Mundo Blanch, Gurb (ES); Nuria Siscart Laguna, Barcelona (ES); Pilar Castan Barberan, Barcelona (ES); Josep Vilaret Ferrer, Santa Maria Martorelles (ES)

(73) Assignee: Kao Corporation S.A., Barbera de Valles (ES)

(21) Appl. No.: 10/073,941

(22) Filed: Feb. 14, 2002

Related U.S. Patent Documents

Reissue of:
(64) Patent No.: 6,265,373
Issued: Jul. 24, 2001
Appl. No.: 09/545,868
Filed: Apr. 7, 2000

(30) Foreign Application Priority Data

Apr. 13, 1999 (EP) ..... 99 106 233

(51) Int. Cl.[7] ..... C11D 1/825
(52) U.S. Cl. ..... 510/506
(58) Field of Search ..... 510/506; 554/149, 554/151, 169, 227, 163

(56) References Cited

U.S. PATENT DOCUMENTS

| | | | | |
|---|---|---|---|---|
| 2,678,935 | A | * | 5/1954 | Sundberg et al. |
| 3,435,024 | A | * | 3/1969 | Nobile et al. |
| 4,115,415 | A | * | 9/1978 | Yoshihara et al. |
| 4,600,539 | A | * | 7/1986 | Hoppe et al. |
| 4,681,900 | A | * | 7/1987 | Iwasaki |
| 4,861,613 | A | * | 8/1989 | White et al. |
| 4,983,329 | A | * | 1/1991 | Cooper |
| 5,175,323 | A | * | 12/1992 | Cooper |
| 5,399,728 | A | * | 3/1995 | Cooper |
| 5,610,130 | A | * | 3/1997 | Thomas et al. |
| 5,665,689 | A | * | 9/1997 | Durbut |
| 5,861,367 | A | * | 1/1999 | Blanvalet et al. |

FOREIGN PATENT DOCUMENTS

| | | | |
|---|---|---|---|
| EP | 0 579 887 A1 | * | 1/1994 |
| EP | 0 586 323 A1 | * | 3/1994 |
| EP | 1045021 | * | 10/2000 |
| WO | WO 95/23204 | * | 8/1995 |
| WO | WO 98/16605 | * | 4/1998 |

* cited by examiner

*Primary Examiner*—John R. Hardee
(74) *Attorney, Agent, or Firm*—Gary M. Nath; Jerald L. Meyer; Nath & Associates

(57) ABSTRACT

The present invention relates to a composition comprising a mixture of alkoxylated mono-, di-, and triglycerides and glycerine of the following formula R' representing H or $CH_3$, and each of m, n, and l independently representing a number from 0 to 4, the sum of m, n and l being in the range of from 1 to 4, each of B1, B2, and B3 representing H or wherein R represents an alkyl or alkenyl group having 6 to 22 carbon atoms.; and the weight ratio of [triglyceride/diglyceride/monoglyceride] *monoglyceride/diglyceride/triglyceride* being 46 to 90/9 to 35/1 to 15.

The invention also relates to methods for the preparation of this composition, to detergent compositions comprising this composition, and to the use of the composition as surfactant or co-surfactant in detergent compositions.

11 Claims, No Drawings

COMPOSITION COMPRISING A MIXTURE OF ALKOXYLATED MONO-, DI- AND TRIGLYCERIDES AND GLYCERINE

Matter enclosed in heavy brackets [ ] appears in the original patent but forms no part of this reissue specification; matter printed in italics indicates the additions made by reissue.

DESCRIPTION

The present invention relates to a composition comprising a mixture of alkoxylated mono-, di-, and triglycerides and glycerine, to methods for the preparation of this composition, to detergent compositions comprising this composition, and to the use of the composition as surfactant or co-surfactant in detergent compositions.

Most of the known detergent compositions use anionic, amphoteric and/or non-ionic surfactants to obtain a final product showing satisfactory properties in terms of detergency and foam profile. However, most of these compositions are generally not satisfactory regarding the problem of ecotoxicity and the irritation to the eyes and the skin.

EP 0 586 323 B1 discloses detergent compositions showing improved properties regarding the ecotoxicity and the irritation to the eyes and to the skin. These compositions comprise the mono-, di- and tri-ester compounds represented by the following formula, wherein the weight ratio of mono-, di-, and tri-ester is 46-90/9-30/1-15:

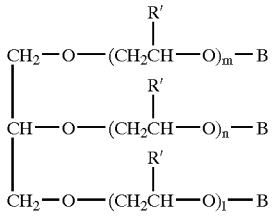

wherein R' represents H or $CH_3$, B represents H or

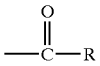

wherein R represents an alkyl or alkenyl group having 6 to 22 carbon atoms, and each of m, n, and l may have a value between 0 to 40, the sum of m, n and l being in the range of from 2 to 100.

The viscosity of compositions disclosed in EP 0 586 323 B1 having a good foaming power is generally low. Although the viscosity may be increased when the alkoxylation degree is lowered, this is generally not preferred, since then the foaming power is also dramatically decreased. Therefore, a salt such as sodium chloride is generally added in order to increase the viscosity. However, adding a salt leads to an enhanced irritation of the skin and the eyes.

In view of this prior art it was the problem underlying the present invention to provide compositions showing a high viscosity and good foam stability, while also showing the good properties with respect to biodegradability and irritation to the eyes and the skin.

This problem is surprisingly solved by a composition comprising (i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] *(iii)*/*(ii)*/*(i)* being 46 to 90/9 to 35/1 to 15:

Formula (I)

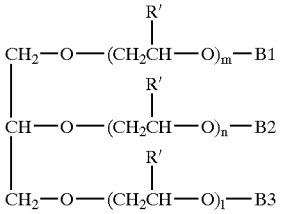

R' representing H or $CH_3$, and each of m, n, and l independently representing a number from 0 to 4, the sum of m, n and l being in the range of 1 to 4;

Formula (II):

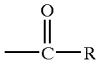

wherein R represents an alkyl or alkenyl group having 6 to 22 carbon atoms.

The weight ratio of the compounds [(i)/(ii)/(iii)] *(iii)*/*(ii)*/*(i)* in the composition of the present invention is preferably 60 to 83/16 to 35/1 to 6.

Particularly preferred are compounds of formula (I) wherein R' in formula (I) represents H, that is, the compounds are ethoxylated derivatives.

The sum of m, n and l in formula (I) is in the range of 1 to 4, preferably 1.5 to 3.0, more preferably in the range of 1.5 to smaller than 2.

The weight ratio (i)+(ii)+(iii)/(iv) is preferably in the range of 85/15 to 40/60, more preferably in the range 80/20 to 45/55.

The compositions of the present invention can be prepared by a first method comprising the following steps:

a) Subjecting a mixture of glycerine and a compound of the following formula (III) to an interesterification reaction:

(III)

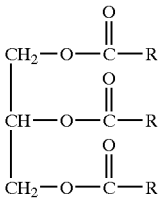

wherein R represents an alkyl or alkenyl group having 6 to 22 carbon atoms, and b) subjecting the reaction mixture obtained in step a) to an alkoxylation using an alkylene oxide having 2 or 3 carbon atoms in the presence of an alkaline catalyst.

The interesterification reaction in step a) is governed by statistics. Consequently, the molar ratio of the compounds (i), (ii), (iii), and (iv) in the final product is determined by the ratio of the starting materials glycerine and the compound of formula (III). The subsequent alkoxylation reaction of step b) is a reaction which generally proceeds quantitatively, so that the amount of alkylene oxide used determines the alkoxylation degree (that is, the sum of m, n, and l). The molar ratio of the compounds (i), (ii), (iii), and (iv) is not affected by the alkoxylation, since the alkylene oxide only reacts with the remaining free hydroxyl groups in the mono- and di-ester molecules and the glycerine. However, the weight ratio of the compounds (i), (ii), (iii), and (iv) is consequently changed. Since the outcome of both reaction steps a) and b) can be predicted by the skilled person, modelling calculations can be employed to determine the correct ratio of the starting materials for a specific predetermined weight ratio of the compounds (i), (ii), (iii), and (iv) and a specific predetermined alkoxylation degree.

The compound of formula (III) includes natural fat and oil as well as synthetic triglycerides. Preferred is a fat or oil including vegetable oil such as coconut oil; palm oil; palm kernel oil; sunflower oil; rape seed oil; castor oil; olive oil; soybean oil; and animal fat such as tallow, bone oil; fish oil; hardened oils and semihardened oils thereof, and mixtures thereof. Particularly preferred are coconut oil, palm oil and tallow such as beef tallow.

Further, the composition of the present invention can be produced by a second method comprising the following steps:

a') Reacting a mixture of glycerine and alkylene oxide having 2 or 3 carbon atoms in the presence of an alkaline catalyst.

b') Reacting the reaction mixture obtained in step a') with a compound of the following formula (IV).

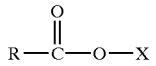

(IV)

wherein R is defined as above for formula (III) and X represents a methyl group or H.

The degree of alkoxylation in the final product (that is, the sum of m, n, and l) is determined by the amount of alkylene oxide employed in step a'). Step b') then determines the molar ratio and the weight ratio of the compounds (i), (ii), (iii), and (iv). Again, the outcome of both reaction steps a') and b') can be predicted by the skilled person, so that modelling calculations can be employed to determine the correct ratio of the starting materials for a specific predetermined weight ratio of the compounds (i), (ii), (iii), and (iv) and a specific predetermined alkoxylation degree.

The compound of formula (IV) is preferably derived from one of the fats or oils which are preferably used in the first method of the present invention and which are listed above. Particularly preferred are tallow fatty acid and coconut oil fatty acid, palm oil fatty acid, or a methyl ester thereof.

The composition of the present invention is preferably used as a surfactant or co-surfactant in detergent compositions in which they are preferably contained in an amount of from 0.5 to 20 wt. %, more preferably 1 to 8 wt. %.

The detergent compositions of the present invention may additionally contain one or more of the following additives, depending on the purpose of the detergent composition, this list being non-limiting.

1. Anionic surfactants such as sodium alkyl ether sulphate, ammonium alkyl ether sulphate, triethanolamine alkyl ether sulphate, sodium alkyl sulphate, ammonium alkyl sulphate, triethanolamine alkyl sulphate, sodium alpha-olefin sulphonate, sodium alkyl sulphonate, sulphosuccinates, and sulphosuccinamates.

2. Fatty acids or soaps derived from natural or synthetic sources such as coco, oleic, soya and tallow fatty acids.

3. Ethoxylated alcohols.

4. Esters of fatty acids from natural or synthetic sources such as glycol, ethylene glycol, diethylene glycol, propylene glycol, dipropylene glycol, saccharose, glucose or polyglycerine.

5. Ethoxylated fatty esters from fatty acids of hydroxy-fatty acids.

6. Amphoteric surfactants such as alkyl amidopropyl betaine, alkyl betaine, alkyl amidopropyl sulphobetaine, alkyl sulphobetaine, cocoamphoacetates, and cocoamphodiacetates.

7. Amine oxides such as dimethyl alkylamine oxides or alkyl amidopropylamine oxides.

8. Amides such as monoethanolamides, diethanolamides, ethoxylated amides or alkylisopropanolamides.

9. Alkylpolyglycosides.

10. Ether carboxylates from alcohols, ethoxylated fatty alcohols.

11. Cationic surfactants such as dialkyl dimethyl ammonium halides, alkyl benzyl dimethyl ammonium halides, alkyl trimethyl ammonium halides, esterquats derived from triethanolamine, methyldiethanolamine, dimethylaminopropanediol and oligomers of such esterquats.

12. Additives to improve such formulations, such as thickeners, pearling agents, opacifiers, antioxidants, preservatives, colorants or parfumes.

EXAMPLES

Compositions of the present invention were prepared according to the following methods; the values for the indicated parameters X, X', s, m, m', n, n', Y, Y', Z, Z' are shown in tables I and II:

Method 1: From Triglyceride

X g (X' moles) of triglyceride (coconut oil or palm oil), m (m' moles) of glycerine and s g of KOH 85% as catalyst are placed in a 2 kg flask properly equipped. The system is purged several times with nitrogen, vacuum stripping is carried out until 110° C., and heating is continued to 140° C. When the temperature reaches 140° C. the reactor is pressurised to 2–3 Kg/cm$^2$ with ethylene oxide added until a total of n g (n' moles).

Method 2: From Methyl Ester m g (m' moles) of glycerine and s g KOH 85% as catalyst are placed in a 2 Kg flask properly equipped. The system is purged several times with nitrogen, vacuum stripping is carried out until 110° C. and heating is continued to 140° C. When the temperature reaches 140° C., the reactor is pressurised to 2–3 Kg/cm$^2$ with ethylene oxide added until a total of n g (n' moles). After the final charges of ethylene oxide, the reaction mixture is allowed to react for about ½ hour, z g (z' moles) of a methyl ester of fatty acid (either coconut oil fatty acid or palmoil fatty acid), is added and mixed for 45 minutes. Finally, the product is cooled and discharged from the reactor.

Method 3: From Fatty Acid m g (m' moles) of glycerine and s g KOH 85% as catalyst are placed in a 2 Kg flask properly equipped. The system is purged several times with nitrogen, vacuum stripping is carried out until 110° C. and heating is continued to 140° C. When the temperature reaches 140° C., the reactor is pressurised to 2–3 Kg/cm$^2$ with ethylene oxide added until a total of n g (n' moles). After the final charges of ethylene oxide, the reaction mixture is allowed to react for about ½ hour, y g (y' moles) of a fatty acid (either coconut oil fatty acid or palm oil fatty acid), is added and mixed for 45 minutes. Finally, the product is cooled and discharged from the reactor.

The weight ratios of the mono-, di-, and triglycerides obtained by the above methods is also indicated in Tables I and II.

Then, detergent compositions were prepared with the composition of the present invention in an amount of 5 wt. % and sodium laurylethersulphate in an amount of 15 wt. %, the balance being water. Sodium chloride was added in the amount indicated in Tables I and II (in wt. %).

The viscosity of the compositions was then measured with a Brookfield viscosimeter at 20° C. For each experiment, a viscosity curve was prepared in order to determine the maximum (values given in cps).

The foam ability was measured at 5 seconds with a Ross-Miles apparatus using water at a temperature of 20° C. and a hardness of 20° HF. (values given in millimeters height).

The results are summarized in Tables I and II.

TABLE I

| | Examples according to the present invention | | | | | | | | | |
|---|---|---|---|---|---|---|---|---|---|---|
| | Mixtures of 15% Active Matter of Sodium Laurylether Sulphate + 5% product | | | | | | | | | |
| EXAMPLES | A | A' | B | D | E | E' | F | F' | G | H |
| Comp. | | | | | | | | | | |
| Mono | 69 | 69 | 69 | 77 | 70 | 70 | 77 | 77 | 71 | 78 |
| Di | 28 | 28 | 28 | 22 | 27 | 27 | 21 | 21 | 26 | 20 |
| Tri | 3 | 3 | 3 | 2 | 3 | 3 | 2 | 2 | 3 | 2 |
| Alkyl chain (R) | Coco | Palm | Coco | Coco | Coco | Palm | Coco | Palm | Coco | Coco |
| EO | 1.88 | 1.88 | 1.76 | 1.4 | 2.5 | 2.5 | 2.5 | 2.5 | 3.5 | 3.5 |
| Prep. way | | | | | | | | | | |
| Method | 1 | 3 | 1 | 3 | 1 | 1 | 3 | 1 | 3 | 3 |
| Tri-glyceride (x) | 461.8 | | 470.3 | | 422.3 | 476.4 | | 400 | | |
| moles trg (x') | 0.69 | | 0.7 | | 0.63 | 0.57 | | 0.48 | | |
| Fatty Acid (y) | | 494.3 | | 396 | | | 329.8 | | 351 | 286.2 |
| moles FA (y') | | 1.85 | | 1.87 | | | 1.56 | | 1.66 | 1.35 |
| Methyl-ester (z) | | | | | | | | | | |
| moles ME (z') | | | | | | | | | | |
| Glycerine (m) | 252.1 | 283.8 | 256.8 | 382 | 230.6 | 209 | 318 | 248.5 | 253.9 | 276 |
| moles gly (m') | 2.74 | 3.09 | 2.79 | 4.15 | 2.51 | 2.27 | 3.46 | 2.7 | 2.76 | 3 |
| Ethylene Oxide (n) | 283.4 | 255.2 | 270.2 | 255.7 | 344.6 | 312.3 | 380.2 | 349.6 | 424.9 | 462 |
| moles (n') | 6.44 | 5.8 | 6.14 | 5.81 | 7.83 | 7.1 | 8.64 | 7.95 | 9.66 | 10.5 |
| KOH (85%) (s) | 2.7 | 1.2 | 2.7 | 1.2 | 2.4 | 2.2 | 1 | 1.8 | 1 | 0.8 |
| Max visc. | 45000 | 80000 | 43000 | 15000 | 22000 | 35000 | 18000 | 25000 | 26000 | 36000 |
| Salt nec. | 2.5 | 2.5 | 2.5 | 6 | 3.5 | 3.5 | 4 | 4 | 3.5 | 4 |
| Foam | 175 | 170 | 175 | 175 | 170 | 170 | 175 | 170 | 170 | 180 |

TABLE II

| | Comparative Examples | | | | | | | |
|---|---|---|---|---|---|---|---|---|
| | Mixtures of 15% Active Matter of Sodium Laurylether Sulphate + 5% product | | | | | | | |
| EXAMPLES | C | I | J | K | L | M | N | O |
| Comp. | | | | | | | | |
| Mono | 90 | 40 | 59 | 77 | 46 | 79 | 69 | 57 |
| Di | 10 | 46 | 35 | 21 | 42 | 19 | 28 | 36 |
| Tri | 0 | 17 | 6 | 2 | 12 | 1 | 3 | 7 |
| Alkyl chain (R) | Coco | Coco | Coco | Coco | Coco | Coco | Coco | Tallow |
| EO | 2.2 | 2.2 | 4.4 | 0.8 | 3.5 | 4.4 | 15 | 9.9 |

TABLE II-continued

| | Comparative Examples | | | | | | | |
|---|---|---|---|---|---|---|---|---|
| | Mixtures of 15% Active Matter of Sodium Laurylether Sulphate + 5% product | | | | | | | |
| EXAMPLES | C | I | J | K | L | M | N | O |
| Prep. way | | | | | | | | |
| Method | 1 | 1 | 1 | 1 | 1 | 1 | 1 | 2 |
| Tri-glycerid (x) | 197.2 | 670.3 | 422.8 | 470 | 561.2 | 266.1 | 187.5 | |
| moles trg (x') | 0.29 | 0.99 | 0.63 | 0.7 | 0.83 | 0.39 | 0.28 | |
| Fatty Acid (y) | | | | | | | | |
| moles FA (y') | | | | | | | | |
| Methyl-ester (z) | | | | | | | | 369 |
| moles ME (z') | | | | | | | | 1.3 |
| Glycerine (m) | 376.8 | 111.8 | 146 | 363.6 | 114.9 | 211.3 | 76.8 | 119.3 |
| moles gly (m') | 4.1 | 1.22 | 1.59 | 3.95 | 1.25 | 2.3 | 0.83 | 1.3 |
| Ethylene Oxide (n) | 424.8 | 213.9 | 428.7 | 163.7 | 320.6 | 521.1 | 734.6 | 564.7 |
| moles (n') | 9.65 | 4.86 | 9.74 | 3.72 | 7.29 | 11.84 | 16.7 | 12.83 |
| KOH (85%) (s) | 1.2 | 3.7 | 2.6 | 2.4 | 3.1 | 1.5 | 1.1 | 1.6 |
| Max visc. | 4000 | 6000 | 13000 | 8000 | 7000 | 9000 | 5000 | 4000 |
| Salt nec. | 5 | 6 | 3 | 4 | 5 | 4 | 4 | 4 |
| Foam | 170 | 175 | 175 | 130 | 160 | 155 | 145 | 120 |

As may be derived from the results above, when the ethoxylation degree is larger than 4 (Ex. J, M, N, O), maximum viscosity is always lower than 14000 cps measured with a Brookfield viscosimeter at 20° C. When the ethoxylation degree is lower than 1 (Ex. K) viscosity is also lower than 14000 cps. When the triester content is lower than 1 (Ex. C; 90/10/0), maximum viscosity is also very low (lower than 14000 cps). When the diester content is too high (Ex. I: 40/46/17 and Ex L: 46/42/12), then the viscosity is also lower than 14000 cps.

However, when the samples are within the alkoxylation degree in accordance with the present invention (1 to 4 EQ mols), viscosities are considerably higher (see Table I). Specially this behaviour is enhanced when the EQ mols are between 1.5 and 3 (Ex A, A', B, E, E', F, F').

Formulations containing the composition of the present invention are exemplified by the following:

The detergent compositions of the present invention may be formulated as shampoos, baby shampoos, conditioning shampoos, bath gels, hair conditioners, for manual dishwashing, and as all purpose cleaners which are exemplified below (all values indicated are weight percentages):

Baby Shampoo

| | BS1 | BS2 |
|---|---|---|
| COMPONENTS | | |
| Deionized water | to 100 | to 100 |
| Sodium Lauryl sulfate (27% Dry) (Emal ® 227E from Kao) | 25.0 | 8.0 |
| Sodium Cocoamphoacetate (40% Dry) (Betadet ® SHC-2 from Kao) | 7.5 | 15.0 |
| Example A product | 2.0 | 2.0 |
| Lauryl hydroxysultaine (45% Dry) (Betadet ® S-20 from Kao) | 4.0 | |
| PEG-20 Sorbitan Laurate (Kaopan ® TW-L-120 from Kao) | — | 1.0 |
| PEG-120 Methylglucose dioleate (Glucamate-DOE-120 ® from Amerchol) | — | 0.2 |
| NaCl | 0.2 | — |
| Preservative | 0.05 | 0.05 |
| ANALYSIS | | |
| Appearance | Transparent viscous liquid | Transparent viscous liquid |
| pH (100%) | 6.5–7.5 | 6.5–7.5 |
| Viscosity (cps) 20° C. | 5000–7000 | 1000–2000 |
| Turbidity point (° C.) | <0 | <0 |
| % Dry matter | 12.5–14.5 | 10.5–12.5 |
| Stability | OK | OK |

Shampoo

| | |
|---|---|
| COMPONENTS | |
| Deionized water | to 100 |
| Sodium Lauryl sulfate (70% Dry) (Emal ® 270E from Kao) | 23.0 |
| Cocoamidopropoxybetaine (48% Dry) (Betadet ® HR-50K from Kao) | 10.0 |
| Example B product | 1.8 |
| Pearling agent (Danox ® P-15 from Kao) | 3.0 |
| Perfume | e.q. |
| NaCl | e.q. |
| Preservative | e.q. |
| ANALYSIS | |
| Appearance | Pearled viscous liquid |
| pH (100%) | 6.0–7.0 |
| Viscosity (cps) 20° C. | ≈8000 |
| % Dry matter | 24–26 |
| Stability | OK |

Conditioning shampoo

| | |
|---|---|
| COMPONENTS | |
| Deionized water | to 100 |
| Sodium Lauryl sulfate (27% Dry) (Emal ® 227E from Kao) | 32.0 |
| Sodium Cocoamphoacetate (40% Dry) (Betadet ® SHC-2 from Kao) | 7.5 |

-continued

| | |
|---|---|
| Example E product | 3.5 |
| Lauryl hydroxysultaine (45% Dry) (Betadet ® S-20 from Kao) | 5.0 |
| Oleic esterquat (80% Dry Matter) (Tetranyl ® CO-40 from Kao) | 0.5 |
| Pearling agent (Danox ® BF-22 from Kao) | 3.0 |
| Perfume | e.q. |
| NaCl | e.q. |
| Preservative | e.q. |
| ANALYSIS | |
| Appearance | Pearled viscous liquid |
| pH (100%) | 6.0–6.5 |
| Viscosity (cps) 20° C. | ≈7000 |
| % Dry matter | 19–21 |
| Stability | OK |

Bath gel

| COMPONENTS | |
|---|---|
| Deionized water | to 100 |
| Sodium Lauryl sulfate (27% Dry) (Emal ® 277 E from Kao) | 37.0 |
| Cocoamidopropoxybetaine (34% Dry) (Betadet ® HR from Kao) | 10.0 |
| Example F product | 2.5 |
| Perfume | 0.5 |
| NaCl | 0.5 |
| Preservative Kathoe CG ® from Rohm & Haas | 0.05 |
| EDTA.$Na_2$ | 0.05 |
| ANALYSIS | |
| Appearance | Transparent viscous liquid |
| pH (100%) | 5.0–6.0 |
| Viscosity (cps) 20° C. | 6000–8000 |
| Turbidity point (° C.) | <0 |
| % Dry matter | 18–20 |
| Stability | OK |

Hair conditioner

| | HC1 | HC2 |
|---|---|---|
| COMPONENTS | | |
| Deionized water | to 100 | to 100 |
| Propyleneglycol | 2.0 | 2.0 |
| Dioleic esteruat (80% Dry Matter) (Tetranyl ® CO-40 from Kao) | 1.9 | — |
| Cetrimonium Chloride (25% Dry) (Quartamin ® 60W25 from Kao) | — | 6.0 |
| Cetearyl alcohol (Kalcol ® 6870 from Kao) | 3.0 | 3.0 |
| Example A product | 0.5 | 0.5 |
| Perfume | e.q. | e.q. |
| Preservative | e.q. | e.q. |
| ANALYSIS | | |
| Appearance | White viscous emulsion | White viscous emulsion |
| pH (100%) | 4–6 | 4–6 |
| Viscosity (cps) 20° C. | ≈5000 | ≈5000 |
| % Dry matter | 4.5–5.5 | 4.5–5.5 |
| Stability | OK | OK |

-continued

Manual dishwashing

| | MD1 | MD3 |
|---|---|---|
| COMPONENTS | | |
| Deionized water | to 100 | to 100 |
| Na Laurylethersulfate (70% Dry) (Emal ® 270E from Kao) | 9.5 | 17.0 |
| Sodium C14–16 Olefin Sulfoeate (37% Dry) (Alfanox ® 46 from Kao) | 27.0 | 14.7 |
| Cocoamidopropoxybetaine (34% Dry) (Betadet ® HR) | 2.0 | 2.0 |
| Cocoamid DEA (Amidet ® B-112 from Kao) | 1.0 | 1.0 |
| Example E' product | 2.0 | 2.0 |
| NaCl | 2.0 | 1.5 |
| Formaldehyde 40% | 0.1 | 0.1 |
| ANALYSIS | | |
| Appearance | Transparent viscous liquid | Transparent viscous liquid |
| pH (100%) | 6.5–7.5 | 6.5–7.5 |
| Viscosity (cps) 20° C. | 400–800 | 400–800 |
| Turbidity point (° C.) | −6 | −4 |
| % Dry matter | 22–24 | 22–24 |
| Washed dishes | 17 | 17 |
| Stability | OK | OK |

All purpose cleaner

| COMPONENTS | |
|---|---|
| Deionized water | to 100 |
| Sodium C14–16 Olefin Sulfonate (37% Dry) (Alfanox ® 46 from Kao) | 14.6 |
| Example E' product | 2.0 |
| Tetrapotassium pyrophosphate | 3.0 |
| Butylglycol | 1.0 |
| EDTA.$Na_4$ | 2.3 |
| Perfume | e.q. |
| Preservative | e.q. |
| ANALYSIS | |
| Appearance | Transparent liquid |
| pH (100%) | 7.0–8.0 |
| Viscosity (cps) 20° C. | <10 |
| % Dry matter | 13.0–14.0 |
| Stability | OK |

What is claimed is:

1. Composition comprising (i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] (*iii*)/(*ii*)/(*i*) being 46 to 90/9 to 35/1 to 15:

Formula (I):

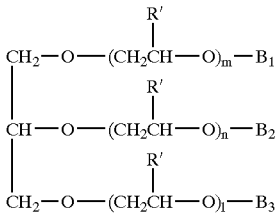

R' representing H or $CH_3$, and each of m, n, and l independently representing a number from 0 to [4] *1*, the sum of m, n and l [being in the range of 1 to 4] *in formula (I) is from 1 to smaller than 2*;

Formula (II):

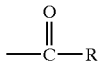

wherein R represents an alkyl or alkenyl group having 6 to 22 carbon atoms.

2. Composition according to claim 1, wherein the weight ratio of the compounds [(i)/(ii)/(iii)] *(iii)/(ii)/(i)* is 60 to 83/16 to 35/1 to 6.

3. Composition according to claim 1, wherein R' in formula (I) represents H.

4. Composition according to claim 1, wherein the sum of m, n and l in formula (I) is in the range of 1.5 to 3.0.

5. Composition comprising (i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] *(iii)/(ii)/(i)* being 60 to 83/16 to 35/1 to 6:

Formula (I):

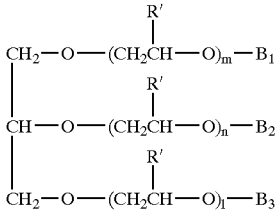

R' representing H, and each of m, n, and l independently representing a number from 0 to 4, the sum of m, n and l being in the range of 1.5 to 3.0;

Formula (II):

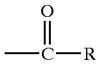

wherein R represents an alkyl or alkenyl group having 6 to 22 carbon atoms.

6. Composition according to claim 5, wherein the sum of m, n and l in formula (I) is smaller than 2.

7. Composition according to claim 5, wherein the weight ratio (i)+(ii)+(iii)/(iv) is in the range of 85/15 to 40/60.

8. Method for the preparation of a composition comprising (i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] *(iii)/(ii)/(i)* being 46 to 90/9 to 35/1 to 15:

Formula (I):

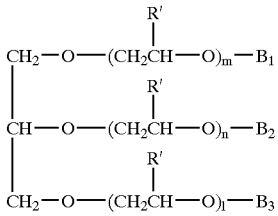

R' representing H or $CH_3$, and each of m, n, and l independently representing a number from 0 to 4, the sum of m, n and l being in the range of 1 to 4;

Formula (II):

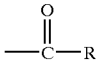

wherein R represents an alkyl or alkenyl group having 6 to 22 carbon atoms;

the method comprising the following steps:

a) subjecting a mixture of glycerine and a compound of the following formula (III) to an interesterification reaction:

(III)

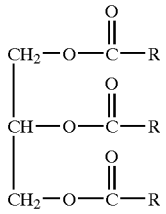

wherein R represents an alkyl or alkenyl group having 6 to 22 carbon atoms, and b) subjecting the reaction mixture obtained in step a) to an alkoxylation using an alkylene oxide having 2 or 3 carbon atoms in the presence of an alkaline catalyst.

9. Method for the preparation of a composition comprising (i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] (*iii*)/(*ii*)/(*i*) being 46 to 90/9 to 35/1 to 15:

Formula (I):

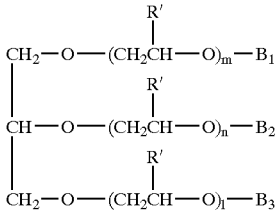

R' representing H or $CH_3$, and each of m, n, and l independently representing a number from 0 to 4, the sum of m, n and l being in the range of 1 to 4;

Formula (II):

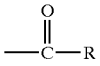

wherein R represents an alkyl or alkenyl group having 6 to 22 carbon atoms;

the method comprising the following steps:

a') reacting a mixture of glycerine and alkylene oxide having 2 or 3 carbon atoms in the presence of an alkaline catalyst, and b') reacting the reaction mixture obtained in step a') with a compound of the following formula (IV):

(IV)

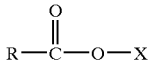

wherein R represents an alkyl or alkenyl group having 6 to 22 carbon atoms, and X represents a methyl group or H.

10. Detergent composition containing a composition comprising the following compounds (i) to (iv) in an amount of 0.5 to 20 wt.-%.

(i) compounds represented by the following formula (I), wherein each of B1, B2 and B3 independently represent a group represented by the following formula (II);

(ii) compounds represented by the following formula (I), wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of [Bi] *B1*, B2 and B3 represent H;

the weight ratio of the compounds [(i)/(ii)/(iii)] (*iii*)/(*ii*)/(*i*) being 46 to 90/9 to 35/1 to 15:

Formula (I):

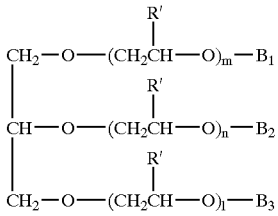

R' representing H or $CH_3$, and each of m, n, and l independently representing a number from 0 to 4, the sum of m, n and l being in the range of 1 to 4;

Formula (II):

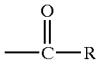

wherein R represents an alkyl or alkenyl group having 6 to 22 carbon atoms.

11. Detergent composition containing a composition comprising the following compounds (i) to (iv) in an amount of 1 to 8 wt.-%.

(i) compounds represented by the following formula (I), wherein each of B1, B2 and B3 independently represent a group represented by the following formula (II);

(ii) compounds represented by the following formula [(II)] (*I*) wherein two of B1, B2 and B3 independently represent a group represented by the following formula (II), the remainder representing H;

(iii) compounds represented by the following formula (I), wherein one of B1, B2 and B3 represents a group represented by the following formula (II); the remainder representing H;

(iv) compounds represented by the following formula (I), wherein each of B1, B2 and B3 represent H;

the weight ratio of the compounds [(i)/(ii)/(iii)] (*iii*)/(*ii*)/(*i*) being 60 to 83/16 to 35/1 to 6:
Formula (I):
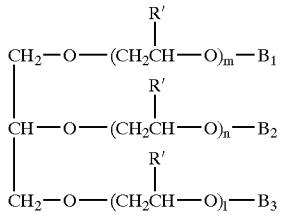
R' representing H, and each of m, n, and l independently representing a number from 1 to 4, the sum of m, n and l being in the range of 1.5 to 3.0;
Formula (II):
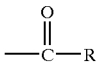
wherein R represents an alkyl or alkenyl group having 6 to 22 carbon atoms.
* * * * *